United States Patent [19]

Zimmerman

[11] 4,348,211
[45] Sep. 7, 1982

[54] GAS GENERATING SYSTEM

[76] Inventor: Edwin H. Zimmerman, R.D. #1, New Holland, Pa. 17557

[21] Appl. No.: 231,987

[22] Filed: Feb. 6, 1981

[51] Int. Cl.³ .............................. C10J 3/30; C10J 3/32
[52] U.S. Cl. ........................................ 48/76; 48/85.2; 48/111; 55/124; 55/385 R; 165/73; 202/117; 202/121; 202/150; 414/176; 414/213
[58] Field of Search ................. 48/111, 209, 76, 86 A, 48/86 R, 85.2, 128; 165/73, 74, 75; 414/160, 173, 176, 213; 201/2.5, 6, 4, 41; 202/99, 93, 85, 108, 121, 84, 150, 117; 55/124, 7, 385 R

[56] References Cited

U.S. PATENT DOCUMENTS

| 996,603 | 7/1911 | Aolakson | 48/80 A |
|---|---|---|---|
| 1,049,994 | 1/1913 | Chapman | 48/86 A |
| 1,086,366 | 2/1914 | Hart | 48/111 |
| 1,107,917 | 8/1914 | Derrick | 48/86 A |
| 2,631,930 | 3/1953 | Peters | |
| 3,852,048 | 12/1974 | Pyle | |
| 3,929,585 | 12/1975 | Grimmett | |
| 3,938,965 | 2/1976 | Pyle | |
| 3,950,143 | 4/1976 | Pyle | |
| 3,977,947 | 8/1976 | Pyle | |
| 4,019,444 | 4/1977 | Kleeberg et al. | 55/124 |
| 4,028,068 | 6/1977 | Kiener | |
| 4,050,907 | 9/1977 | Brimhall | |
| 4,052,173 | 10/1977 | Schulz | 48/200 |
| 4,057,401 | 11/1977 | Boblitz | |
| 4,086,144 | 4/1978 | Grulich et al. | 202/262 |
| 4,118,281 | 10/1978 | Yan | |
| 4,157,958 | 6/1979 | Chow | |
| 4,164,397 | 8/1979 | Hunt et al. | |
| 4,225,392 | 9/1980 | Taylor | 48/85 |
| 4,249,855 | 2/1981 | Dhoudt | 201/41 |

Primary Examiner—William F. Smith
Attorney, Agent, or Firm—C. Hercus Just

[57] ABSTRACT

A gas generating system utilizing cellulosic waste, such as sawdust and the like, of a low BTU rating, which is partially dried on the closed top of, and then fed to the bottom of a conical generator into which a limited air supply is delivered to the upper portion of the generator where a combustion zone occurs to sinter the material and form steam and wood gas (methane) which passes to and through a heat exchange coil in an after-cooler tank in which water is heated incident to cooling the gas which successively passes through several cyclone units which successively remove dust, ash, creosote and other condensates, a blower also being included to induce a low rate of suction in the system to insure movement of the gas through the system which finally preferably is passed through a scrubber to clean the gas product of any appreciable impurities and the scrubbing water is recirculated to absorb more impurities after being stratified to remove heavy condensates and other solids.

15 Claims, 8 Drawing Figures

GAS GENERATING SYSTEM

BACKGROUND OF THE INVENTION

Both prior and subsequent to 1900, many devices were patented to operate upon wood in various forms, even as logs, and heated by furnaces to form charcoal and gas, some of the gas being referred to as carbureted hydrogen or wood gas. Retorts were also employed in which the wood material was roasted. Some of these devices also contemplated creosote recovery. Since that time, and especially in the past few years during which the "energy crunch" has been in evidence, production of gas and other useful products from many kinds of waste material, including garbage and almost any kind of burnable or fermentable material, has been the subject of wide research and some U.S. patents have been obtained, such as:

U.S. Pat. No. 4,050,970—Brimhall—Sept. 27, 1977
U.S. Pat. No. 4,057,401—Boblitz—Nov. 8, 1977
U.S. Pat. No. 4,118,281—Yan—Oct. 3, 1978
U.S. Pat. No. 4,157,958—Chow—June 12, 1979 which pertain to recovering or generating gas from garbage and the like.

A recent survey by the Division of Forestry of Florida has revealed that nearly one million tons of wood residue is deposited annually in landfills in that state alone. This conceivably can be salvaged for use as fuel, either directly or converted to useful fuel, such as gas. The farming industry also generates substantial quantities of waste material in the form of corn cobs, fodder, straw, waste vegetation, fence row brush, and the like, much of which is convertible to useful fuel products. The lumber industry also generates vast quantities of waste in the form of chips, sawdust and bark, which similarly can be converted to useful fuel production.

The availability of this type of waste material for development of useful fuel has not gone unnoticed by enterprising individuals and companies, as evidenced by the following U.S. patents, which primarily are directed to the formation of various types of charcoal from wood waste and the like:

U.S. Pat. No. 3,938,965—Pyle—Feb. 17, 1976
U.S. Pat. No. 3,950,143—Pyle—Apr. 13, 1976

Still other efforts have been utilized in the production of useful gas and/or charcoal and evidence of this is found in the following U.S. patents:

U.S. Pat. No. 2,631,930 to Peters, dated Mar. 17, 1963, which discloses carbonizing sawdust by electric heating coils, which keeps sawdust turbulent, ash is removed, and the resulting gas is filtered and collected.

U.S. Pat. No. 3,852,048 to Pyle, dated Dec. 3, 1974, disclosed drying woody waste material which is carbonized to charcoal and fuel gas, is cooled and combined to form an enriched solid charcoal fuel that is pollution-free.

U.S. Pat. No. 3,929,585 to Grimmet, dated Dec. 30, 1975, pertains to mixing waste wood products with inert bed material, such as sand and alumina, to form a fluidizable mixture heated in a bed pyrolyzer to form charcoal, which is separated from the bed material as activated carbon.

U.S. Pat. No. 3,977,947 to Pyle, dated Aug. 31, 1976 relates to forming a hot fluidized bed or previously formed charcoal which is injected into wood waste to form gas and charcoal which are separated and the charcoal is sized for use as fuel.

U.S. Pat. No. 4,028,068 to Kiener, dated June 7, 1977, discloses a process to subject waste material to low temperature carbonization to form gas by exclusion of air which is drawn through a reaction bed of solid carton with fresh air to form high energy combustible gas.

U.S. Pat. No. 4,164,397 to Hunt, dated Aug. 14, 1979, shows converting wood to fuel gas by letting it descend in a bed reactor in which gas is ascending and removed from the top of the reactor, a portion of the gas being recirculated and introduced as reflow gas with air to the combustion zone at the base of the descending bed.

SUMMARY OF THE INVENTION

It is among the principal objects of the present invention to provide a reliable and efficient gas-generating system which utilizes, in particular, waste wood products, such as chips, sawdust, bark, and the like, but also is capable of being operable with other preferably cellulosic materials to transform the same into useful fuel of a gaseous nature, and various percentages of charcoal or other additional useful materials, while requiring only very minimal power to operate the system, which includes a conical generator, having a closed top onto which the raw material is initially discharged to partially remove the moisture therefrom before introducing the material to the bottom of the generator by means of rams that cause the material to move upwardly in the generator toward the upper portion thereof where the combustion zone occurs as a result of limited introduction of air, while agitating the material, and thereby effect sintering of the same to separate steam and wood gas, such as methane, from the residue which usually comprises charcoal, some of which is further sintered to produce carbon monoxide and ash, the gases thus produced then being cooled and purified.

It is another object of the invention incident to cooling the aforementioned gases, to effect heat exchange with water capable of being utilized for heating purposes in buildings of various kinds.

A further object of the invention is to cool the gases that pass from the generator by means of cooling tubes descending through a tank in which the aforementioned water is contained, the gas discharging from the lower end of the cooling tubes for passage through one or more cyclone units, where separation of creosote and other recoverable condensates occurs, thereby assisting in the purification of the gas product.

Still another object of the invention is to employ a low capacity blower or fan, preferably in the vicinity of the cyclone units, to induce a low rate of suction, especially upon the gaseous products in the upper portion of the generator, and thereby assist in the introduction of limited amounts of ambient air for use in the combustion zone where the aforementioned sintering occurs, as well as to induce movement of the gaseous products through the cooling tubes referred to above, and also force the same through the additional purifying equipment primarily in the form of a scrubber.

A still further object of the invention is to recover useful products resulting from the scrubbing operation, by floatation processes or otherwise, said scrubbing operation resulting in the formation of so-called black water, which has an affinity for creosote materials and this is re-introduced into the scrubber for recirculation therethrough and thereby absorb additional creosote and other condensates.

Another object of the invention is to operate the entire system automatically with minimum supervision of personnel.

Details of the foregoing objects and of the invention, as well as other objects thereof, are set forth in the following specification and illustrated in the accompanying drawings comprising a part thereof.

DETAILED DESCRIPTION OF THE PREFERRED EMBODIMENTS

As indicated above, the system comprising the present invention has been developed for purposes of utilizing cellulosic wastes of various types and, more particularly, sawdust, wood shavings, and other by-product waste materials generated especially in wookworking plants, sawmills, as well as other industries generating cellulosic wastes of various kinds. The primary purpose of the invention is to generate useful gas, particularly for heating purposes, as well as for use in conjunction with motor-generator units for generating electrical current. The amount of power input in neglagable, especially in comparison with the beneficial products resulting from operation of the gas generating system and the process which employs the same.

Figure 1:
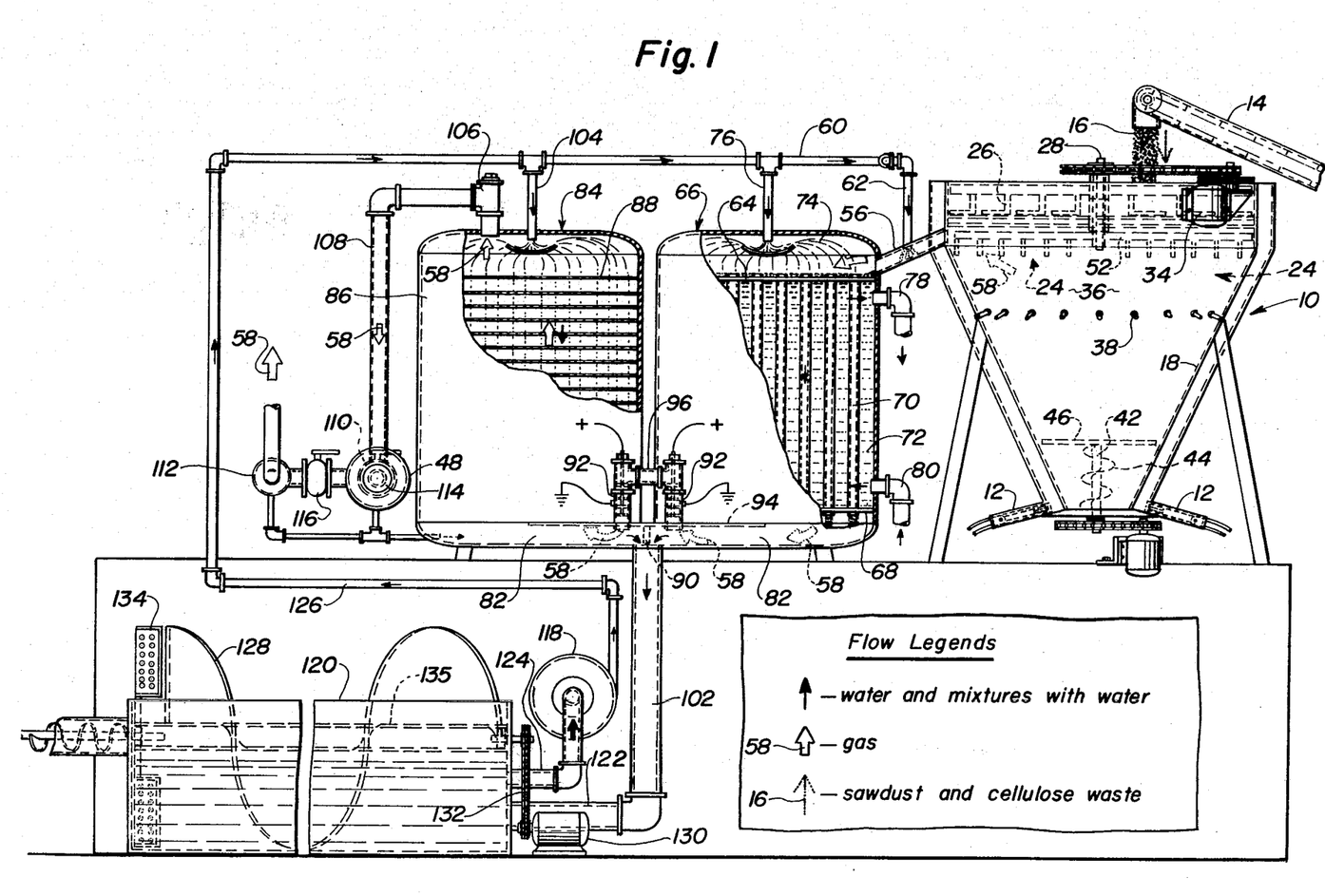
FIG. 1 is a side elevation of a gas generating system embodying the principles of the present invention and certain of the components of the system being partly broken away to illustrate details therein and certain other elements also being broken away to simplify the illustration, said figure also including a description of flow legends employed in the illustration.
Figures 2, 5:
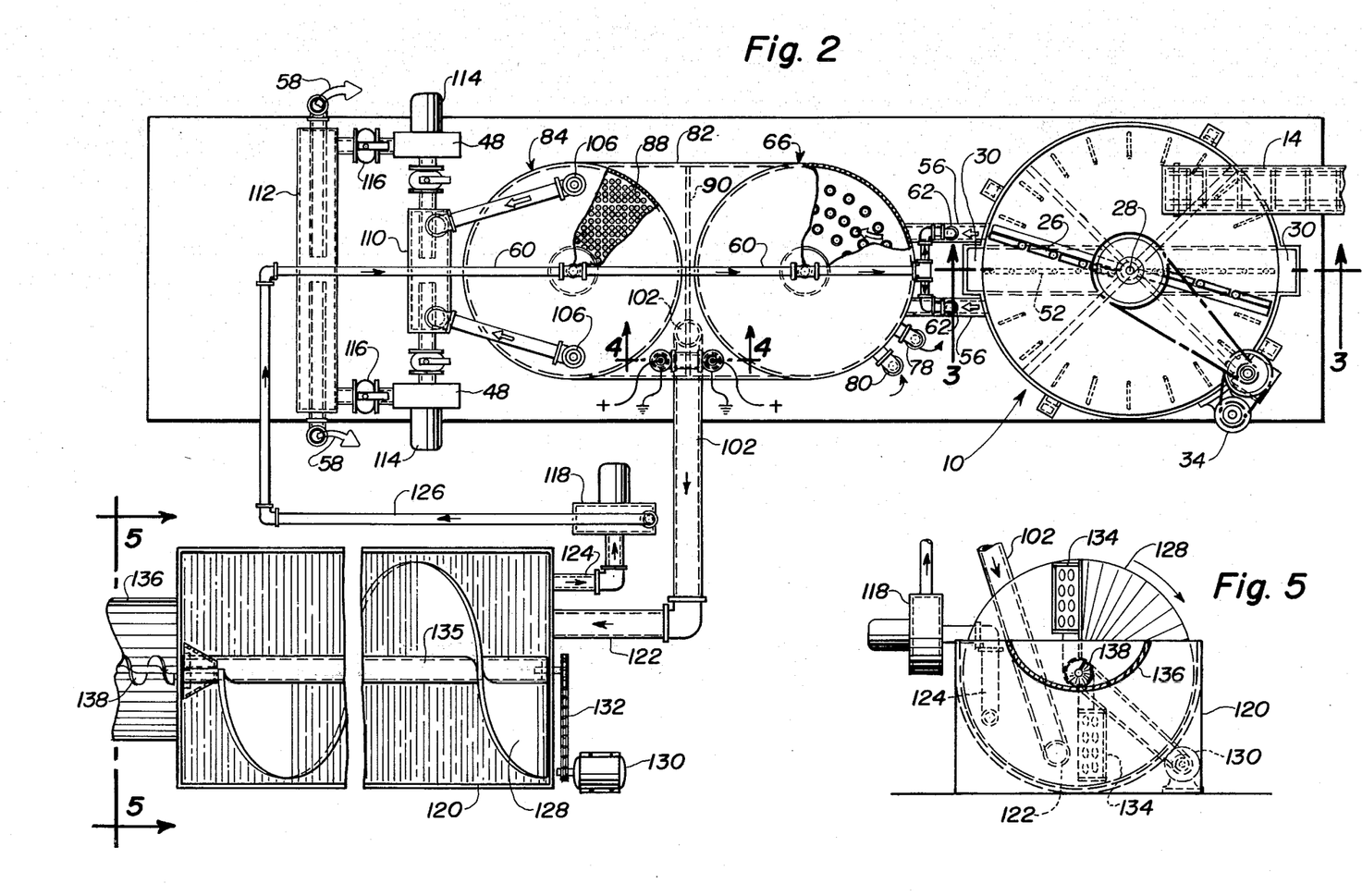
FIG. 2 is a top plan view, partly fragmentary and partly broken away, illustrating the system shown in FIG. 1.
FIG. 5 is a vertical sectional view, partly fragmentary, illustrating the stratifying unit shown in FIGS. 1 and 2, especially as seen on the line 5—5 of FIG. 2.
Figures 3, 4, 6:
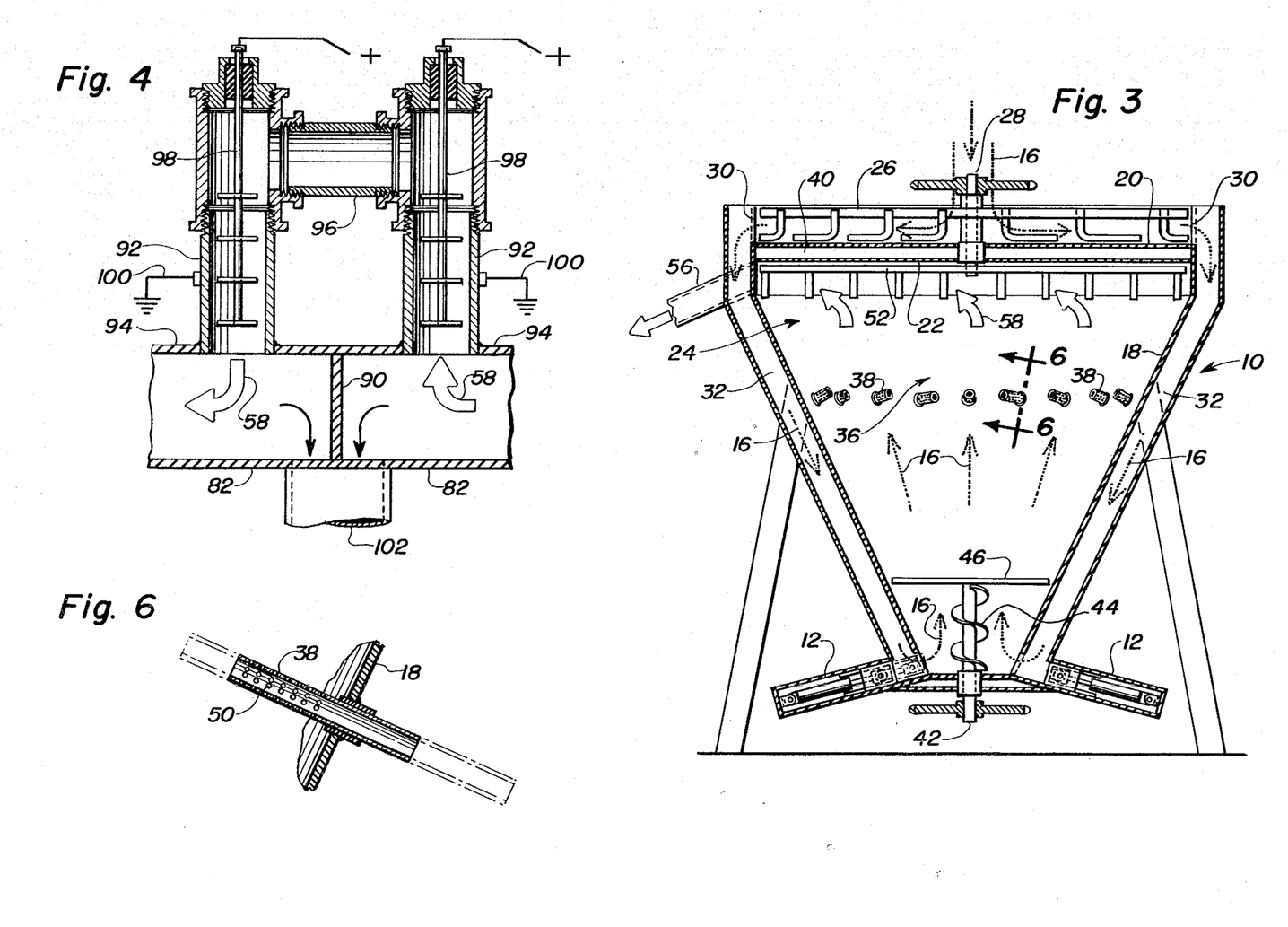
FIG. 3 is a vertical sectional view of the gas generator shown in FIGS. 1 and 2, as seen on the line 2—2 thereof and utilizing a larger scale than employed in said previous figures.
FIG. 4 is an enlarged fragmentary vertical sectional view showing details of an electric precipitator included in the system shown in FIGS. 1 and 2, as seen on the line 4—4 of FIG. 2 and employing a larger scale than used in said preceding figures.
FIG. 6 is an enlarged fragmentary vertical sectional view showing a detail of air inlet means for the gas generator, as seen on the line 6—6 of FIG. 3.

In FIGS. 1 and 2, a somewhat diagrammatic illustration is shown in straight line manner but it will be understood that the various units of the system may be arranged in other physical locations than those illustrated, especially for adapting the system to certain physical locations, within or outside of plants or establishments in which the generated gas products and other by-products are to be utilized beneficially. Initial generation of the gas by converting the cellulosic waste material to the same comprises the generator 10, which preferably comprises a conical shell formed of sheet steel and the like, said shell tapering downwardly as illustrated in FIGS. 1 and 3, and one of the principal beneficial factors resulting from use of this type of generator is that the raw material, such as sawdust and the like, is fed to the bottom portion of the shell 10, preferably by means of a pair of opposed rams 12 operated, for example, by hydraulic motors. In one specific embodiment, not shown in detail, it is possible to utilize a single rotary type hydraulic motor and, by means of cranks and connecting rods, the rams may be operated in sequence while employing a single hydraulic motor.

Referring to FIGS. 1 and 2, it will be seen that any suitable means, such as an elevator 14, feeds the waste material 16, such as sawdust, into the upper portion of the generator 10. As shown in cross-section in FIG. 3, the top of the conical shell 18 is closed by at least one horizontal diaphragm sheet 20 but, preferably, a second sheet 22 also extends across the top of the shell 18 and is fixed at the edges thereto for purposes of defining in the upper portion of the shell a gas accumulating chamber 24.

The material 16 is discharged onto the upper diaphragm sheet 20 where it accumulates and is progressively discharged by means of a rotary rake 26 affixed to a central shaft 28 rotatably mounted upon the cover sheets 20 and 22, for discharge of the material through openings 30 of the circular rim, and into the downwardly extending chutes 32 for delivery to the rams 12. Rotation of the shaft 28 and the rake 26 is by means of an electric motor 34 which drives a sprocket chain and the sprockets engaged thereby, as clearly shown in FIGS. 1 and 2.

The material is discharged onto the diaphragm sheet 20 for purposes of preliminary treatment of the material, primarily to remove at least part of the moisture therefrom, which is driven off as vapor due to the heat imparted to the cover sheet 20 by the combustion zone 36, which is generally in the vicinity and slightly above the air inlet means comprising a circular horizontal row of radially extending tubes or nozzles 38, best shown in detail in FIG. 6. In actual practice, it has been found that there sometimes is a tendency for the material to become overheated upon the cover sheet 20, and as a result, the second sheet 22 preferably is included to provide a dead air space 40 between the sheets 20 and 22 and thereby reduce the temperature of the top sheet 20. To insure the progressive movement of the material introduced to the lower part of the shell 18 by the rams 12, the lower portion of the shell contains a rotary shaft 42 upon which an auger 44 is mounted and rotated in a direction to move the material upwardly and a transverse agitator arm 46 also has a tendency to stir the material to prevent it from becoming unduly compacted and thereby aid in the upward movement of the material into the combustion zone 36.

Figure 7:
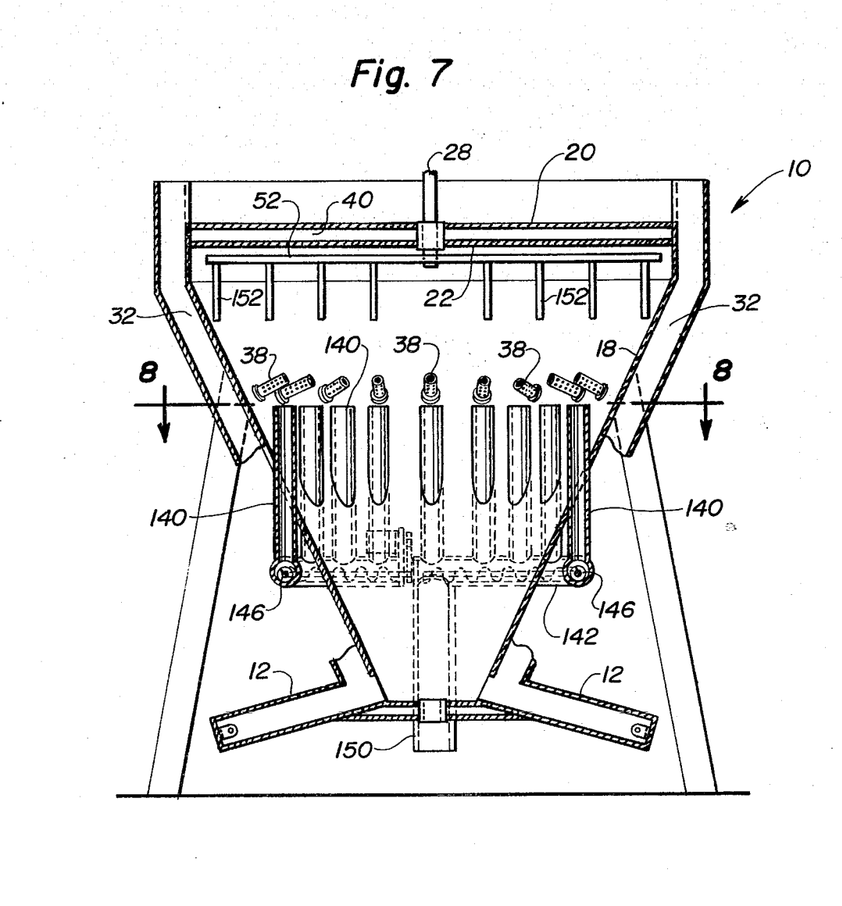
FIG. 7 is a view similar to FIG. 3, but showing a modified version of the gas generator, especially adapted for purposes or primarily producing charcoal and gas.
Figure 8:
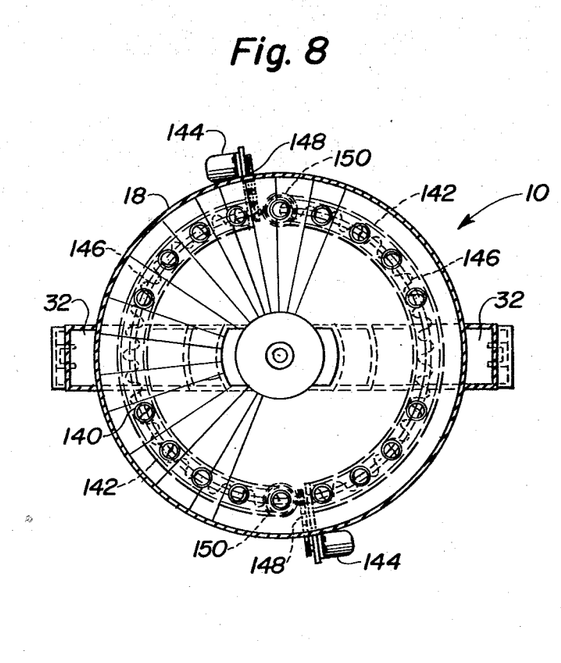
FIG. 8 is a sectional plan view of the generator shown in FIG. 7, as seen on the line 8—8 thereof.

After the shell 18 of the generator has been initially loaded with a charge of the material 16, such as up to or slightly beyond the row of air inlet tubes 38, combustion is initiated by the application of gas torches or otherwise through the tubes 38, and after such commencement of burning and sintering, operation of the feeding means described above is instituted and the process of generating useful gas continues automatically due to the inclusion in the system of vacuum-generating means in the form of blowers 48 which are substantially downstream from the generator 10. The blowers are operated at a desired speed regulated to create sufficient suction in the generator 10 to cause intake of ambient air through the air inlet tubes 38. As can be visualized from FIG. 6, the inner end of said tubes are also provided with additional discharge holes 50 and said tubes may be adjusted axially incident to establishing the preferred operation of the combustion zone 36 in a manner to destruct the raw material into useful gas, such as methane and possibly some carbon monoxide, together with, preferably, a limited amount of ash and some charcoal. In accordance with another embodiment of the generator, however, as illustrated in FIGS. 7 and 8 and described in detail hereinafter, if the preferred product is to be charcoal, the combustion zone may be regulated to produce substantial proportions of charcoal, in addition to useful gas and the charcoal may be removed from the generator in accordance with the embodiment shown in FIGS. 7 and 8 by means illustrated therein. In accordance with one method of operating the system, however, the products of sintering and combustion, in addition to gas, comprise smoke, charcoal dust and some proportion of charcoal, which is removed from the upper portion of the combustion zone by an internal rotary rake 52, shown in full lines in FIG. 3, and in phantom in FIGS. 1 and 2. The material engaged by the rake 52 is progressively moved to discharge ports in the shell 18 opposite the rake 52 for communication with a pair of discharge conduits 56, best shown in plan view in FIG. 2, and in side elevation in FIGS. 1 and 3. Said conduits also remove the generated gas from the gas accumulating chamber 24, the top of which is defined by the lower cover sheet 22, and the discharge of gas therefrom is indicated by the arrows 58 in the various FIGS. 1-3. Water conduit means 60 has one discharge pipe 62 communicating with the discharge conduits 56 through which gas and other solid by-products and smoke travel by vacuum induced by blowers 48, and these are mixed with water to provide the dual function of facilitating the movement of the material onto the upper header 64 in the after-cooler tank 66 and also to initiate cooling of the gas.

GAS-COOLING TANK

The gas-cooling tank 66 or after-cooler tank, as it is sometimes referred to in the industry, preferably is a circular tank, as seen in FIG. 2, and includes an upper header 64 and a lower header 68, between which a plurality of tubes 70 extend vertically, said tank and tubes somewhat resembling a so-called higher-tube boiler. The tank 66 between the upper and lower headers 64 and 68 contains cooling liquid 72, which surrounds the tubes and absorbs heat from the gas and other by-products passing downward therethrough by gravity, as further induced by the introduction of additional water 74 from a difused fuser onto which water discharges from another discharge pipe 76 connected to water conduit means 60. As the function of the system progresses, the liquid, which is preferably water 72, within the tank 66, absorbs heat and may be piped from opposite ends of the tank, such as by discharge and inlet nipples 78 and 80, which are connected in series with radiator or other types of heat transfer means employed, for example, to heat space in buildings, such as factories or other buildings, including residences, such circulation being by conventional pump means, not shown. Due to the suction imposed upon the lower ends of the tubes 70 by the blowers 48, the gas contained in the discharge material from the generator 10 will also descend through the tubes 70 along with the solution of water and other solid combustion products and will enter the longitudinally extending compartment 82 disposed commonly beneath the tank 66 and the scrubbing unit 84, which comprises another tank 86, in which a stack of vertically spaced perforated diaphragms 88 are supported. As shown by the arrows 58 in the compartment 82 in FIG. 1, the gas moves horizontally in the lower part of tank 66 until it hits a barrier 90 extending across the compartment 82 for purposes of forcing the gas 58 especially as shown in FIG. 4, to rise in a transfer conduit arrangement comprising vertical tubes 92, respectively extending upward from a horizontal plate 94, partially extending in opposite directions from the barrier 90, as shown in phantom in FIG. 1, the upper ends of the vertical tubes 92 being connected by a horizontal tube 96, said tubes comprising the housing for electrostatic percipatator means in the form of positive electrodes 98 connected to an electrostatic generating unit, not shown, and the tubes 92 being grounded as shown by electric conductors 100, in FIG. 4. This apparatus is for purposes of percipatating especially the smoke occurring in the gases moving between the tank 66 and the scrubbing unit 84, whereby said smoke particles are readily entrained within the liquid solution contained in the longitudinal compartment 82, it being understood that only the gas will pass through the percipatator unit, while the liquid descends in conduit 102, which is offset from the percipatating unit below barrier 90.

SCRUBBING UNIT

As mentioned above, the scrubbing unit 84 comprises a tank 86 in which a plurality of substantially parallel perforated discs or diaphragms 88 are fixedly mounted and through which gas discharge from the percipatating unit described above enters the lower portion of tank 86 and rises, by suction, induced by blowers 48, through the perforations of the diaphragms 88 as liquid from the water conduit 60 discharges through another discharge pipe 104, as shown in FIG. 1, onto another liquid difuser and trickles through the perforations of the diaphragms 88, while the gas rises therethrough and is washed by said liquid. The descending water entrains condensates occurring in the gas and carries them in solution form to the longitudinal compartment 82 for flow into the liquid conduit 102, having its entrance immediately beneath the barrier 90, as offset from the percipatating unit, as can be seen from FIG. 2, in which the conduit 102 is shown in phantom. The washed gas rises to the intake 106 of gas conduit 108 connected to the blowers 48, the gas travel being indicated by the arrows 58. For purposes of further purification of the gas, a pair of interrelated cyclone units 110 and 112 are in series with the blowers 48, as shown in FIG. 2, and preferably there are two gas intakes 106, shown in FIG. 2, which respectively communicate with opposite ends of the dual cyclone unit 110 and the gas passing therethrough and the blowers 48 enters the dual cyclone unit 112 for the passage of washed gas to any suitable collecting means, such as a tank, or is directly piped to heating means, such as a furnace, gas-operated motor generator unit to develop electric current, or otherwise, as indicated by the arrows 58 at the opposite ends of the dual cyclone unit 112 in FIG. 2. The blowers 48 are operated by electric motors 114 and control valves 116 also preferably are included between the blowers and the inlet ends of the dual cyclone unit 112 for selective shutting of the conduit means, if desired for any purpose, whereby it is possible to close one of the intakes 106 and use only the other one.

The water which is circulated through the conduit means 60 is known as "black water," and is water which was initially introduced into the system and after a reasonable amount of circulation thereof, the same entrains certain impurities, especially condensates, such as creosote and the like, and becomes dark or black in color. Such water, however, has even better affinity for absorbing additional condensates than clean water, and hence, it is used for re-circulation by means of a pump 118 which conveniently might be termed the black water pump, shown in FIGS. 1 and 2. The inlet of the pump is connected to one end of a stratifying unit comprising a stratifying tank 120, which usually is located at a lower level than the cooling and scrubbing tanks 66 and 86, as diagrammatically illustrated in FIG. 1. By such arrangement, the black water draining from the bottoms of tanks 66 and 86 into the longitudinal compartment 82 flows by gravity through the liquid conduit 102 to the inlet pipe 122, which enters the lower portion of the stratifying tank 120, as shown in FIG. 1, at a lower level than the outlet pipe 124, through which liquid from the tank 120 is drawn into the 118 for discharge through the circulating pipe 126, shown in FIGS. 1 and 2 that communicates with the horizontal overhead water conduit 60.

STRATIFYING TANK

The stratifying tank 120 is somewhat of a settling tank and as the impurity-laden liquid flows into the lower portion of the tank through the inlet pipe 122, gravity tends to settle the heavy liquids and solid materials toward the bottom of said tank and the lighter liquids floating to the top for discharge from the tank through outlet pipe 124. In the tank, propelling and circulating means are provided in the form of a relatively large simple helical flight 128, which rotates about a horizontal axis at slow speed by means of another electric motor 130 of relatively low horse power and drives an endless sprocket chain 132 to rotate the shaft 134 of said flight. The flight 128 is turned in a direction to progressively move the heavy liquid and solid material toward the left-hand end of the tank, as visualized in FIGS. 1 and 2, elevating means are provided, preferably operable by the shaft 135 in the form of a pair of perforated scoops 134, which tend to elevate the solid material and discharge it onto a receiving pan 136, upon which a relatively small auger 138, or other removable means is mounted for purposes of transferring the material to other additional compression means or otherwise, not shown, by which the waste material may be compressed into bricket or block form and is of a nature having relatively high BTU values for fuel purposes. The separated resins, creosotes, and other impurities separated from the gas, likewise are included in such by-product, and add to the fuel value thereof.

CHARCOAL-PRODUCING EMBODIMENT

Referring to FIGS. 7 and 8, there is illustrated therein portions of the generator 10 which are modified for purposes of maximizing the production of charcoal from the waste cellulose material, in addition to gas which also is capable of being produced incident to sintering the waste material to form charcoal. Therefore, in FIGS. 7 and 8, only those portions of the conical shell 18 of the generator 10 are shown which function in the capacity to produce, and particularly to remove, charcoal from the generator. All elements of the generator, which are similar to those shown in the preceding figures, especially FIGS. 1-3, are identified by the same reference numerals as used in the latter figures.

While it is possible to provide other means for removing the charcoal from the conical shell 18, it has been found that the means illustrated, especially in FIGS. 7 and 8, has been useful and operable to a reasonable degree of efficiency for charcoal removal. Referring to these figures, it will be seen that a plurality of tubes 140 are arranged in circular configuration, as seen in FIG. 8, and project vertically through complementary openings formed in the conical shell 18, and are connected to said shell by any suitable means, such as welding. The upper ends of said tubes are preferably adjacent the air inlet tubes 38, as shown in FIG. 7, and preferably are adjacent the combustion zone where sintering principally takes place to reduce the cellulose waste material, such as sawdust, to charcoal and gas. In relation to producing charcoal, it is preferred that a minimum of ash be produced and this can be done by suitably regulating the suction induced by the blowers 48 and by which the intake of air from the ambient atmosphere through the inlet tubes 38 is regulated. Further regulation may be provided, for example, by inserting plugs, not shown, in the outer ends of the tubes 38, as readily can be visualized from FIG. 6, and the number and location of such inserted plug is determined empirically, which is possible after some practice of operating the system.

By way of example of dimensions, but without restriction thereto, the diameter of the upper end of the shell 18 may be of the order of between ten and twelve feet, and the height also may be of a similar range of dimension. For practical operability, the tubes 140 may be in the vicinity of four or five inches in diameter. Considering the fact that the charcoal produced by the system generally is of a particulate nature, as distinguished from chunks, the aforementioned exemplary diameter of the tubes 140 is practical.

The lower ends of the tubes 140 commonly communicate with a circular manifold 142, which, from a practical standpoint, is in two sections, as shown in FIG. 8. Each section extends respectively from a hydraulic or electric motor 144, and extends substantially 180 degrees around the circumference of the generator shell 18, and in spaced relation thereto, as seen in FIG. 7. Flexibly mounted within each semi-circular section of the manifold 142 is an auger 146, illustrated in phantom in FIGS. 7 and 8, and end views thereof being shown in FIG. 7. Such augers are commercially available and they extend between opposite ends of the semi-circular sections of the manifold 142, one end of the auger being connected to sprocket gear and chain means 148 on the auger and motors 144 for driving the same in a direction to feed the material from the lower ends of the tubes 140 to the discharge end of each semi-circular manifold section 142 which communicates with a downwardly extending discharge tube 150, which depends from the discharge end of each semi-circular section of the manifold 142, as clearly shown in FIG. 7. Any appropriate receptacle means may be arranged with respect to the discharge tube 150 to either accumulate or move the discharge material from the generator.

In the embodiment of the invention shown in FIGS. 1-6, it will be seen that the internal rotary rake 52 has depending prongs thereon of limited length, which is satisfactory especially for progressively moving the products of combustion toward the discharge conduits 56. In the coke-forming embodiment, shown in FIG. 7, however, it is preferred that the prongs 152 be of a greater length than those shown in FIG. 1, for example, for purposes of agitating the sintered products, primarily comprising charcoal, and enabling them to remain particulate and capable of gradually working into the upper ends of the discharge tubes 140 for the charcoal.

From the foregoing, it will be seen that the present gas-generating system and process is provided with means primarily to produce gas from waste material, such as sawdust and wood chips and the like, which has appreciable BTU values and is capable of being used for heating and also for use as a fuel in a motor generator unit for generating electric current. Incident to converting the waste material into useable gas and other solid by-products, condensates, etc., the cooling arrangement for the gas includes the use of cooling water which absorbs heat from the gas and, in turn, is heated and may be used in radiators, for example, for space heating, such as in a factory or other types of buildings. One embodiment of the above-described system also is designed especially for the production of charcoal as a by-product in addition to the formation of gas, and in order to vary the types of products which can be produced by the system, regulation particularly in the intake of ambient air to the conical generator is the means by which the production product is obtained. Also, while certain dimensions and shapes are described and illustrated, these primarily are exemplary in nature and even the illustrated angularity of the conical shell of the generator may be varied so as to be best suited for handling the particular type of waste cellulosic material to be converted by the system into useful products.

The foregoing description illustrates preferred embodiments of the invention. However, concepts employed may, based upon such description, be employed in other embodiments without departing from the scope of the invention. Accordingly, the following claims are intended to protect the invention broadly, as well as in the specific forms shown herein.

I claim:

1. A system to generate gas products having useful B.T.U. values from waste cellulosic material capable of being sintered and charred and comprising in combination:
   a. a conical metallic generator shell positioned vertically and tapering downwardly to material inlet means in the bottom thereof,
   b. a closure for the top of said generator shell to form with the walls of the shell a gas accumulating chamber in the upper portion of said shell,
   c. means to feed waste material progressively into said inlet means for progressive movement upwardly in said shell from the lower portion thereof,
   d. controlled air inlet ports spaced circumferentially around said generator shell adapted to form a sintering type combustion zone within waste material in the upper portion of said shell below said gas accumulating chamber,
   e. gas outlet means extending from and communicating with said gas accumulating chamber,
   f. means in the lower portion of said shell operable to agitate the material and feed it upwardly in said shell in a manner to loosen the same as it ascends in the widening area of the upper portion of said shell,
   g. suction means downstream from the upper portion of said shell and operable adjustably to induce the inlet of ambient air into said combustion zone through said controlled air inlet ports to control the rate of sintering of the material to generate combustible gas,
   h. movable means mounted within the upper portion of said shell below said closure and operable to agitate the solid products resulting from combustion and the sintered products and effect progressive removal thereof laterally from the shell adjacent said combustion zone with the useful gas produced by the sintering of said material, and
   i. means communicating with said gas outlet means to receive said gas and separate the same from the solid products of combustion and the sintered products removed therewith from said combustion zone.

2. The system according to claim 1 further characterized by said top closure for said shell being substantially horizontal and including means to deliver waste material to the upper surface of the top of said closure for preliminary treatment to at least partially reduce the moisture therein by drying, and sweep-like rotary means operable upon said surface to remove said treated material progressively across and from said closure and deliver it downwardly to said means to feed the material to said inlet means in the bottom of said shell.

3. The system according to claim 1 in which said air inlet means comprises a series of nozzles extending around the circumference of said shell substantially within a horizontal plate adjacent said combustion zone and communicating therewith to introduce ambient air thereto to determine the position of the combustion zone in said shell.

4. The system according to claim 1 in which said separating means comprises a cooling tank having inlet and outlet means respectively adjacent the top and bottom thereof, the inlet means including a conduit from said generator shell positioned to receive a mixture of gas and other products from said combustion zone of said generator, said suction means of said system communicating with the outlet means of said tank and operable to move said mixture downwardly through said tank as received from the outlet means of said shell, and water inlet means communicating with said conduit means from said generator and operable to introduce water into said mixture to facilitate the separation of said gas from other products and also effect cooling of said gas and movement of the solid material in said mixture.

5. The system according to claim 4 in which said tank comprises a top and bottom header between which a multiplicity of tubes extend for descending passage therethrough of said mixture of gas and other products with the added water, and said tank and headers containing cooling water surrounding said tubes and adapted to absorb heat from the mixture descending within said tubes and thereafter being adapted for circulation through heat transfer means for space heating purposes and the like.

6. The system according to claim 5 further including a scrubbing unit having means to receive the fluid mixture of gas and other products from the bottom of said cooling tank, means in the bottom of said scrubbing unit to permit gas to rise therein, and pump means operable to elevate the liquid solution to the top of said unit and discharge it by gravity downward through a stack of perforated diaphragms while gas rises therethrough to be washed by the descending liquid to absorb further impurities from the gas and permit discharge of washed gas therefrom.

7. The system according to claim 6 further including a blower constituting said suction means of said system said blower being connected to the upper portion of said scrubbing unit and operable to form suction therein and thereby cause said gas to rise in said unit for discharge from the top thereof after being washed by fluid descending through said diaphragms.

8. The system according to claim 7 further including cyclone separating means communicating with the discharge from said blower and operable further to purify the gas discharged from said scrubbing unit.

9. The system according to claim 7 further including electronic precipitator means connected to the outlet from the cooling tank and operable to precipitate impurities, such as fine charcoal and/or ash and smoke particles from the gas and condition said impurities for entrainment in the liquid flowing from said cooling tank to said scrubbing unit.

10. The system according to claim 6 in which the liquid descending within said scrubbing unit comprises black water which has an affinity to absorb impurities, such as creosote and other condensate by-products resulting from the sintering and/or combustion of waste cellulose products, and said system further including a circulating pump operable to receive said black water from the bottom of said cooling tank and scrubbing unit and recirculate the same to the top of said cooling tank and scrubbing unit for further passage therethrough for absorption of said aforementioned condensates.

11. The system according to claim 10 further including a stratifying receptacle having receiving and discharge ends and means thereon communicating with the lower portions of said cooling tank and scrubbing unit, and means operable in said receptacle to move the heavier stratum settling in said receptacle toward said discharge ends of said receptacle while the lighter liquids float thereabove, and means to return said lighter liquids to said circulating pump.

12. The system according to claim 11 further including means connected to said discharge end of said receptacle and operable to consolidate said heavier stratum to remove liquid thereupon and discharge said heavier stratum as a useful fuel high in B.T.U. content.

13. The system according to claim 1 further including means to regulate said suction means to effect sintering of said waste cellulosic products in a manner to produce said gas products and also reduce the material in said combustion zone to charcoal and minimum ash, discharge means for said charcoal in said generator shell adjacent said combustion zone and comprising a series of tubes extending upwardly through the shell of said generator in a circumferential pattern, the upper ends thereof being adjacent said combustion zone and the lower ends discharging into charcoal accumulating means, and means movably supported within said shell adjacent said combustion zone and operable progressively to move charcoal from said combustion zone to said discharge means for charcoal.

14. The system according to claim 13 in which said charcoal accumulating means comprises a manifold supported exteriorly of said generator shell and the lower ends of said tubes communicating therewith for discharge of charcoal thereinto.

15. The system according to claim 14 in which said manifold is circular tube means and includes flexible flight means operable to move charcoal along said circular tube means to discharge ports therein, and power means connected to said flights to rotate the same in a direction to feed charcoal to said discharge ports.

* * * * *